United States Patent [19]
Gretz

[11] Patent Number: 5,628,087
[45] Date of Patent: May 13, 1997

[54] FOLDABLE STUD BUSHING

[75] Inventor: Thomas J. Gretz, Clarks Summit, Pa.

[73] Assignee: Arlington Industries Inc., Scranton, Pa.

[21] Appl. No.: 498,668

[22] Filed: Jul. 3, 1995

[51] Int. Cl.⁶ .................................. B65D 55/00
[52] U.S. Cl. ............................................ 16/2.1
[58] Field of Search .............................. 16/2, 3

[56] References Cited

U.S. PATENT DOCUMENTS

| | | | |
|---|---|---|---|
| 2,424,757 | 7/1947 | Klumpp, Jr. | 16/2 |
| 2,663,895 | 12/1953 | Petri | 16/2 |
| 4,137,602 | 2/1979 | Klumpp, Jr. | 16/2 |
| 4,192,477 | 3/1980 | Decky et al. | 16/2 |
| 4,299,363 | 11/1981 | Datschefski | 16/2 |
| 4,474,489 | 10/1984 | Simon | 16/2 |
| 4,675,937 | 6/1987 | Mitomi | 16/2 |
| 4,706,999 | 11/1987 | Hynes | 16/2 |

*Primary Examiner*—Chuck Y. Mah

[57] ABSTRACT

This invention consists of a foldable bushing that may be easily inserted within a hole in a metal framing stud used in the construction of buildings. The bushing may be applied to either holes of regular shapes such as round, square, or rectangular, or to irregular shaped holes. Use of the bushing protects electrical wires that are pulled through the holes within metal framing studs. The bushing is of simple construction, easy to mass produce, and easy to apply. As it may be applied to a wide range of hole shapes and sizes, a minimal number of versions of the bushing satisfy a large variety of applications.

6 Claims, 3 Drawing Sheets

FOLDABLE STUD BUSHING

FIELD OF THE INVENTION

This invention relates to bushings for protecting electrical cables, and particularly, to an improved stud bushing that can be easily mass produced and easily applied to an opening within a stud. The bushing protects electrical cables passing within the bushing from abrasion with the sides of the opening. The bushing will work on standard openings such as those that are circular, square, or rectangular shaped or on irregular shaped openings.

BACKGROUND OF THE INVENTION

Bushings have been used to protect electrical cables in various applications such as passage through bulkheads, firewalls, panels, etc. With the increased use of metal studs for framing buildings, electrical cables must be passed through holes within metal studs. In the past framing studs were commonly constructed of wood, and cables passed through holes or openings in wood studs were not abraded by the relatively soft sides of the opening. Today, it is becoming common to frame a commercial building or residential house with metal studs. Openings in the metal studs, either pre-stamped or pre-cut or those drilled or punched at the construction site, commonly have sharp edges that can easily catch and abrade the insulating layer of an electrical cable. Cables must be protected when they are pulled through openings in metal studs.

It is common to protect electrical cables from abrasion with openings by installing a bushing that matches the contours of the opening. A major disadvantage to this approach occurs when the opening is of an irregular shape, requiring the installer to stock a variety of different shaped bushings.

It has also been common to provide bushings that consist of two parts, or one part with two sections hinged together. The parts or sections of the bushing are snapped together through the opening to create a non-abrasive edge for protecting cables.

SUMMARY OF THE INVENTION

This invention consists of a foldable stud bushing that is of one piece construction that may be easily applied to either a common or irregular shaped opening in a metal stud.

OBJECTS AND ADVANTAGES

One object of the present invention is to provide a stud bushing that is of one piece construction. This allows the bushing to be easily mass produced at low cost. It also reduces the overall size of the bushing allowing it to occupy little stocking space.

A second object of the present invention is to provide a stud bushing that is easily applied at the construction site. This is accomplished by providing a bushing that is foldable and of one piece construction and therefore may be easily folded and snapped into an opening.

Another object is to provide a stud bushing that may be used on many different shaped openings. The foldable stud bushing of this invention accomplishes this objective by being adaptable to openings of many different shapes, including standard shapes such as circular, square, or rectangular and irregular shapes such as keyhole openings.

DESCRIPTION OF THE INVENTION

The invention is a foldable stud bushing that may be applied to openings within metal framing studs to eliminate abrasion by the sharp edges of the metal against cable surfaces passed through the opening.

Figure 1:
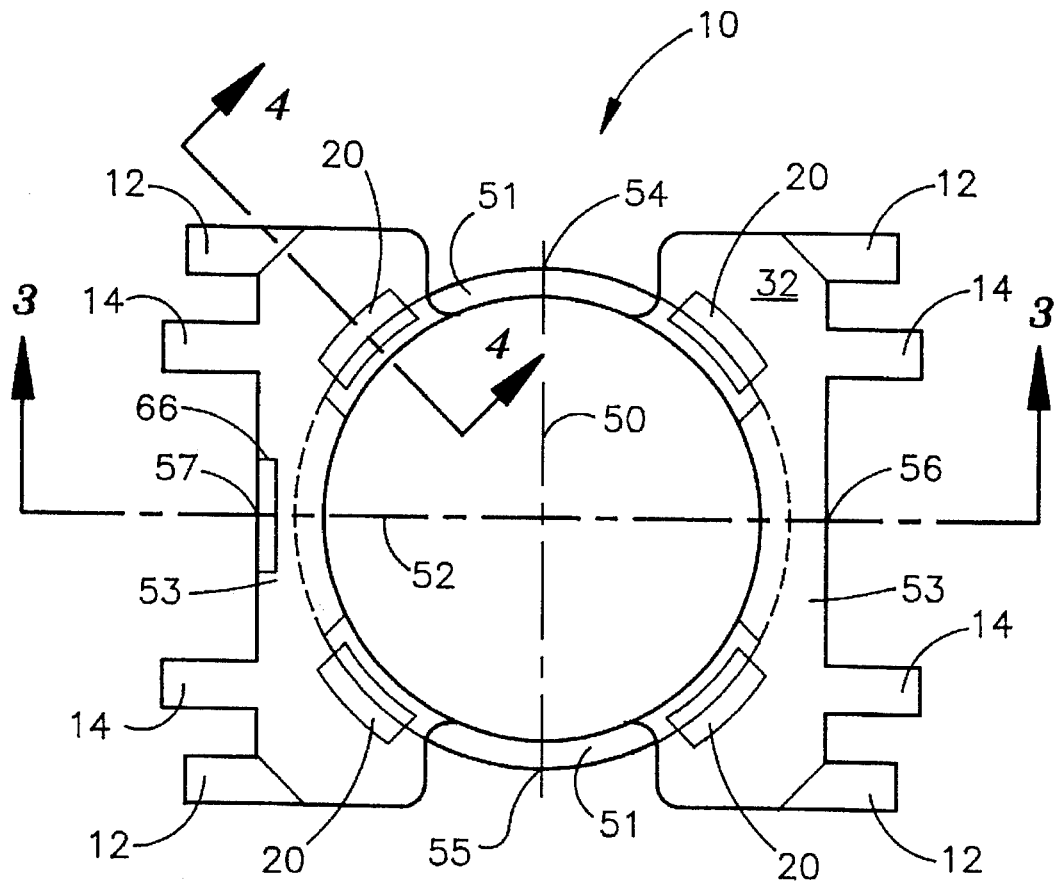
FIG. 1 is a plan view of a first and preferred embodiment of the present invention, a foldable stud bushing with a circular projection portion for circular holes.

FIG. 1 is a plan view of a first and preferred embodiment of the foldable stud bushing 10. The bushing 10 has inner fingers 12 and outer fingers 14 for bracketing and holding the foldable stud bushing within various shaped openings in metal studs.

Figure 2:
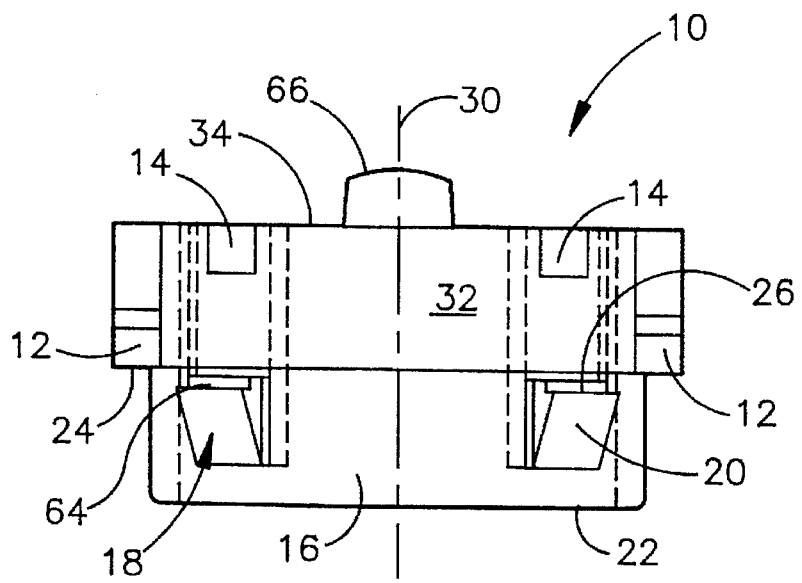
FIG. 2 is a side view of the first embodiment of the foldable stud bushing as viewed from the right side of FIG. 1.

As shown in FIG. 2, a circular projection portion 16 extending from the base portion 32 of the bushing 10 is used for inserting the bushing in a circular opening within a metal framing stud. Two of the four locking tangs 20 that are spaced around the periphery of the circular projection portion 16 are shown in FIG. 2. Each locking tang 20 has an inclined surface 18 and a gripping ledge 26. The foldable stud bushing 10 has a central longitudinal axis 30 through its center and the center of the circular projection portion 16. The foldable stud bushing 10 has a forward edge 22 on the circular projection portion 16 and a base edge 34 on the opposite end. The inner 12 and outer 14 fingers extend toward the viewer in FIG. 2 with the inner fingers 12 positioned toward the forward edge 22 and the outer fingers 14 positioned toward the base edge 34.

Figure 3:
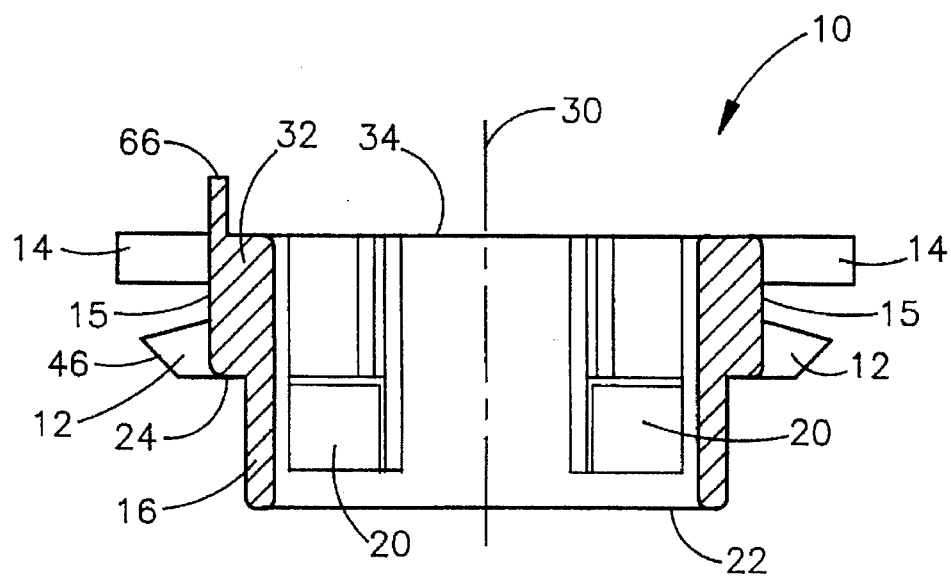
FIG. 3 is a cross-sectional view of the foldable stud bushing taken along line 3—3 of FIG. 1.

FIG. 3 is a cross-sectional view of the foldable stud bushing taken along line 3—3 of FIG. 1. The cross sections of the base portion 32 and the circular projection portion 16 of the foldable stud bushing 10 are visible in FIG. 3. Shown extending from the base portion 32 are the inner 12 and outer 14 fingers. Inner fingers 12 have a beveled edge 46 toward the forward edge of the bushing 10 to enable them to slip easily through a hole in a stud. A seat 15 defined by the gap between the inner 12 and outer fingers 14 exists along the outer periphery of the base portion 32 of the foldable stud bushing 10. The seat 15 is designed to envelop the wall of the stud and hold the bushing 10 therein. The wall of outer finger 14 adjacent seat 15 extends in a direct radial direction and the wall of inner finger 12 adjacent the seat 15 is slightly inclined to a radial direction so that the walls converge towards the base of the seat. This helps center the stud wall in the seat 15. The four inner fingers 12 and four outer fingers 14 along the outer periphery of the base portion 32 therefore define four seats 15 including a pair of seats 15 on each side of the foldable stud bushing 10 shown in FIG. 3. The first pair of seats extend in opposite directions generally along a first line and a second pair of seats extend in opposite directions generally along a second line with the first line and second line spaced apart and parallel to one another.

Referring to FIG. 3, the first line could be defined as a line extending along the right side of the base portion between the inner 12 and outer 14 fingers and the second line is then defined as a line extending along the left side of the base portion between the inner 12 and outer 14 fingers.

The foldable stud bushing 10 may be applied to a circular hole, typically 1.34 inches in diameter, by simply aligning the bushing with the hole and pushing it within the hole. The bushing is constructed of a flexible material, such as polypropylene, and as the circular projection portion 16 is aligned with and pushed within the circular hole within the stud, the locking tangs 20 contact the inside surface of the circular hole on their inclined surfaces 18. The outer diameter of the circular projection portion is typically 1.30 inches. The inside surface of the circular hole exerts pressure upon the inclined surface 18 of each locking tang 20 as the bushing 10 is pushed into the hole and causes each locking tang 20 to flex inwardly toward the central longitudinal axis 30 of the bushing 10. The bushing 10 is pushed into the circular hole until flange surface 24, which is the side of the base portion 32, contacts the stud wall. At this point, or shortly before this point of insertion is reached, the locking tangs 20 snap back into their original position as a result of the flexible and elastomeric material of construction of the bushing and the fact that the inner circular surface of the hole in the stud has cleared the gripping ledge 26 of the locking tang 20. The gripping ledge 26 holds the bushing 10 within the circular hole in the stud and prevents it from being withdrawn.

For irregular shaped holes, the base portion 32 of the bushing 10 including the inner 12 and outer 14 fingers are utilized to fasten the bushing and provide protection for the electrical cables running therethrough. As shown in FIG. 3, the inner 12 and outer 14 fingers define a seat 15 which will hold fast to a stud. To install the bushing within an irregular shaped hole, the collapsible nature of the foldable stud bushing is utilized.

As shown in FIG. 1, the bushing 10 may be squeezed so that it bends along the bisection points of lateral axis 50 through thin sidewall 51 which bends more readily than the bisection of lateral axis 52 with thick sidewall 53. Since thin sidewall 51 flexes more easily than thick sidewall 53, then less pressure is required to collapse the bushing when applying pressure at the bisection of lateral axis 52 with the thick sidewall 53, or at points 56 and 57 as denoted in FIG. 1. Applying pressure at points 56 and 57 causes thin sidewall 51 to collapse outwardly through bending in the vicinity of bending points 54 and 55 and this causes the inner 12 and outer 14 fingers to retract toward lateral axis 50, thereby reducing the outer profile, including the fingers, of the base portion 32. The reduction in outer profile is sufficient in most cases to allow inner fingers 12 to slip past the stud wall. The stud wall is then seated in the seat 15 between the inner 12 and outer 14 fingers when the pressure is removed to allow the fingers to spring back out.

The method of installing and seating the bushing 10 within an irregular shaped hole by applying pressure along lateral axis 52 on the thick sidewall 53 area of the base portion 32, specifically at points 56 and 57 in FIG. 1, is assisted by finger grips 66. Applying pressure at points 56 and 57 with the assist of finger grips 66 causes both the inner 12 and outer 14 fingers to move toward lateral axis 50. Usually this movement of the fingers and the beveled edge 46 of the inner fingers 12 facing the stud, as shown in FIG. 3, is sufficient to allow the inner fingers 12 to slip within the irregular shaped hole in the stud. At full insertion the bushing 10 is therefore resting with the stud wall seated within seat 15, and the outer 14 fingers hold it from being inserted further and the inner fingers 12 prevent it from being withdrawn as cable is pulled through the bushing.

Figure 4:
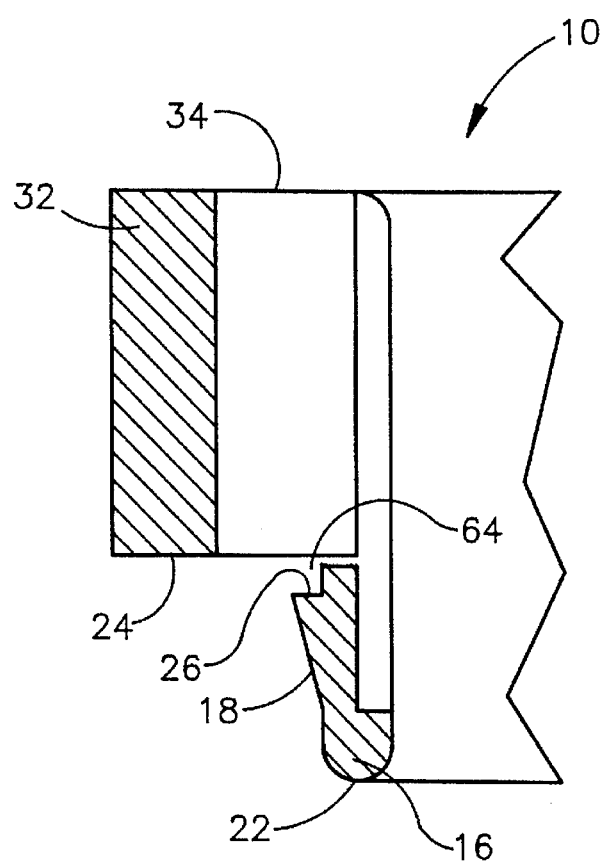
FIG. 4 is a cross-sectional view of the foldable stud bushing taken along line 4—4 of FIG. 2.

FIG. 4 is a cross-sectional view of the first embodiment of the foldable stud bushing 10 taken along lines 4—4 of FIG. 1. In this figure, the bushing 10 is depicted with the base portion 32 and locking tang 20 bisected. The base portion 32 has a base edge 34 which is located exterior of the stud after insertion. The forward edge 22 of the circular projection portion 16 is the edge which enters the hole within the stud. If installed in a circular hole of the proper diameter, the surface of the circular hole within the stud rides up on the inclined surface 18 of the locking tang 20, forcing the locking tang 20 to bend inwardly toward the central longitudinal axis of the bushing. After the outer wall of the stud has cleared the gripping ledge 26 of the locking tang 20, the locking tang snaps outward of the central longitudinal axis of the bushing and returns to its unbiased position, thereby locking the bushing within the circular hole in the stud. As shown in FIG. 4, a circular seat 64 is formed by the gap between the gripping ledge 26 and the flange surface 24 and the outer periphery of the circular projection portion 16. The bushing 10 can be inserted no further than flange surface 24, which acts to stop the forward travel of the bushing into a circular hole.

Figure 5:
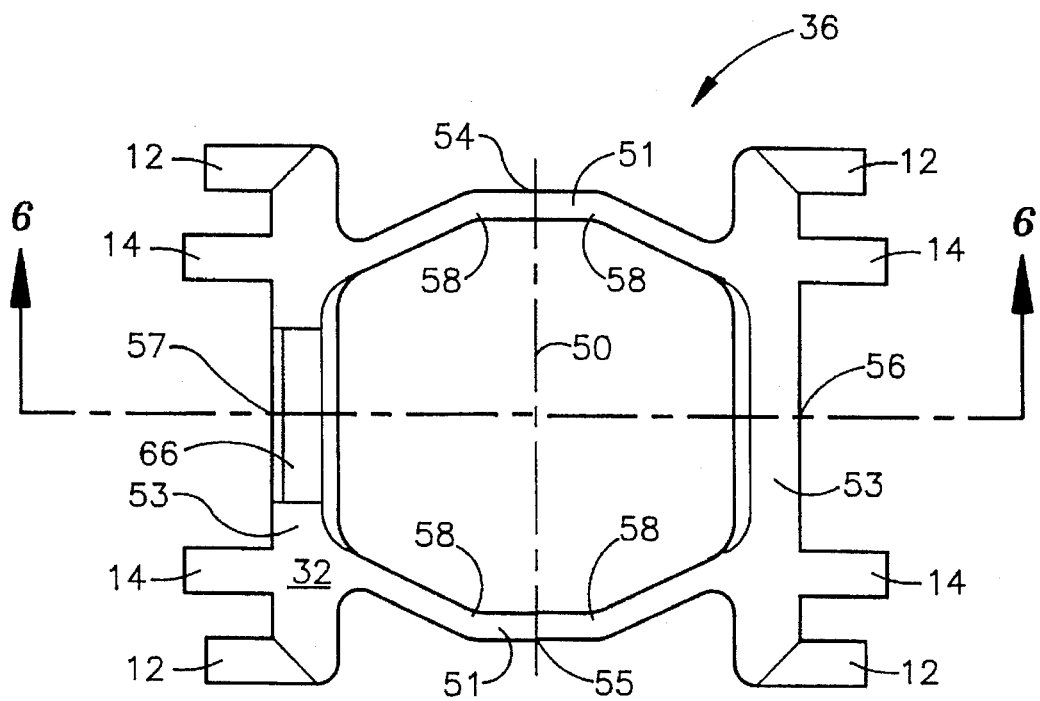
FIG. 5 is a plan view of a second embodiment of the foldable stud bushing.

FIG. 5 is a plan view of a second embodiment 36 of the foldable stud bushing. The second embodiment 36 has a base portion 32 as in the first embodiment but does not have a circular projection portion. The thickness of the second embodiment of the foldable stud bushing is therefore not as great as the thickness of the first embodiment. This can be seen by referring to the cross-sectional view of the second embodiment in FIG. 6 and comparing the distance between the forward 60 and outer 62 edges of the second embodiment with the distance between the forward edge 22 and base edge 34 of the first embodiment as shown in FIG. 3. It will be seen from the following description that the lesser thickness of the second embodiment contributes to greater ease of folding the bushing as compared to the first embodiment.

The second embodiment 36 of the foldable stud bushing also is shown in FIG. 5 with lateral axes 50 and 52. Lateral axis 50 bisects the thin sidewall 51 of the second embodiment and lateral axis 52 bisects the thick sidewall 53. The thin sidewalls 51 of the second embodiment have outwardly bowed hinge points 58. When the second embodiment 36 of the foldable stud bushing is folded by applying pressure at points 56 and 57, where lateral axis 52 bisects the thick sidewall 53 of the bushing, the thin sidewall 51 bends outwardly at the four outwardly bowed hinge points 58. To assist in applying pressure, finger grips 66 are provided. As the thin sidewall 51 bows outwardly at the bowed hinge points 58, the thick sidewalls 53 including the integral inner 12 and outer 14 fingers collapse toward central lateral axis 50. The collapsing of the bushing is sufficient to allow the inner fingers 12 to snap within most regular and irregular shaped holes within a metal framing stud.

Figure 6:
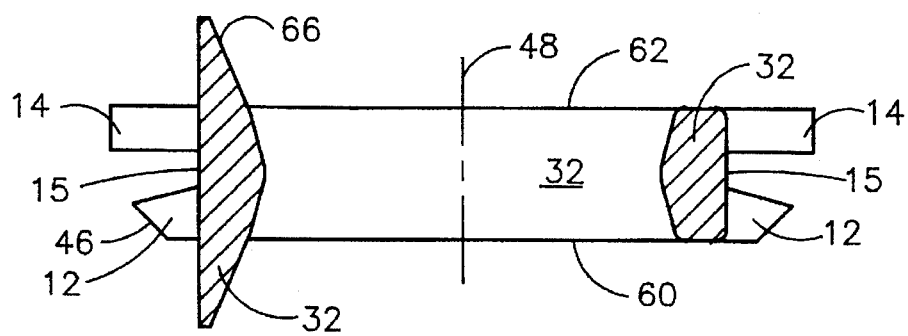
FIG. 6 is a cross-sectional view of the second embodiment of the foldable stud bushing taken along line 6—6 of FIG. 5.

As shown in the cross-sectional view of the second embodiment in FIG. 6, the base portion 32 has a forward edge 60 and an outer edge 62. The inner fingers 12 are adjacent the forward edge 60 and have beveled edges 46 facing the direction of insertion. When the foldable stud bushing 36 is inserted in a hole in a framing stud, the beveled edges 46 enable the inner fingers 12 to slip more easily into the hole. After the inner fingers 12 have slipped within the hole, the outer fingers 14, which extend further from the base portion 32 than the inner fingers 12, stop the forward travel of the bushing. The bushing is then seated in the hole with the wall of the stud resting within seats 15. The walls of the inner 12 and outer 14 fingers adjacent each seat 15 are the same as described earlier in connection with the first embodiment. As for the first embodiment, there are four seats 15 along the base portion 32 of the second embodiment with a first pair of seats extending in opposite directions generally along a first line and a second pair of seats extending in opposite directions generally along a second line with the first line and second line spaced apart and parallel to one another. Referring to FIG. 6, if the first line is defined as running along the right side of the base portion 32 shown in FIG. 6 then the second line would extend along the left side of the base portion.

As can be seen by comparing the cross-section of the second embodiment in FIG. 6 with the cross-section of the first embodiment in FIG. 3, as a result of the absence of a circular projection portion on the second embodiment, there is much less material between the forward and outer edges of the second embodiment as compared to the first, enabling the second embodiment to flex more easily than the first.

Figure 7:
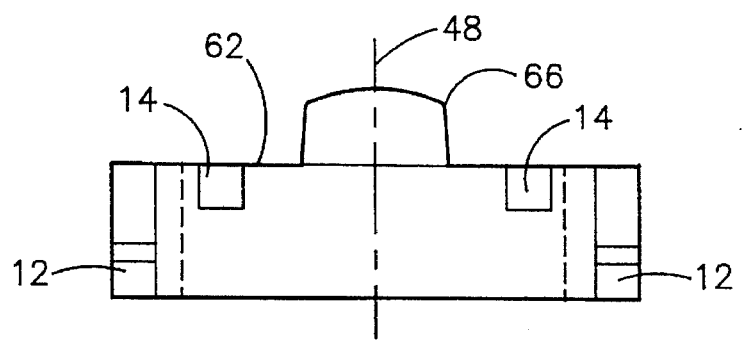
FIG. 7 is a side view of the second embodiment of the foldable stud bushing as viewed from the right side of FIG. 5.

FIG. 7 is a side view of the second embodiment of the foldable stud bushing as viewed from the right side of FIG. 5. The second embodiment of the foldable stud bushing 36 has a central longitudinal axis 48 through its center. The foldable stud bushing 36 has a forward edge 60 and an outer edge 62. The inner 12 and outer 14 fingers extend toward the viewer in FIG. 7 with the inner fingers 12 positioned toward the forward edge 60 and the outer fingers 14 positioned toward the outer edge 62.

The main advantage of the second embodiment of the foldable stud bushing over the first embodiment is that it is easier to fold and apply to a hole within a framing stud and uses less material. The first embodiment however has the added feature of being adaptable to easy insertion within a round hole in a stud.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A foldable stud bushing comprising:

a base portion having a forward edge and an outer edge, an inner periphery and an outer periphery, and a central axis:

integral fingers extending from said outer periphery of said base portion, said fingers including outer fingers adjacent said outer edge and inner fingers away from said outer edge and situated toward said forward edge;

a plurality of seats defined by the spaces between said inner and outer fingers around said outer periphery of said base portion;

said base portion having two relatively thick walls opposite and parallel to one another with said fingers extending from said relatively thick walls; and said relatively thick walls being connected to each other by relatively thin walls with said thin walls being without fingers, said thin walls defining a fold area midway along each of said relatively thin walls with said bushing being able to flex around said fold areas when pressure is applied to said outer periphery of said bushing.

2. The foldable bushing of claim 1 furthermore including an integral circular projection portion extending from said base portion coaxially with said central axis, said circular projection portion having a forward edge and a plurality of flexible locking tangs around its outer periphery, said locking tangs having sides defined by slots within said circular projection portion, said locking tangs integral with said circular projection portion toward said forward edge and free near its juncture with said base portion, said locking tangs furthermore having an inclined outer face, said outer face flush with said circular projection portion at said forward edge and inclined outwardly of said circular projection portion at its opposite end, said inclined face ending in a gripping ledge that is spaced a predetermined distance from said base portion with said predetermined distance creating a stud wall receiving seat.

3. The foldable stud bushing of claim 1 wherein said inner fingers have a beveled edge facing said forward edge of the bushing.

4. The foldable stud bushing of claim 1 wherein hid bushing is made of a flexible elastomeric material that enables said bushing to fold around said fold areas.

5. The foldable stud bushing of claim 1 wherein said inner fingers have beveled surfaces adjacent said seats.

6. The foldable stud bushing of claim 1 wherein said seats are four in number with a first pair of seats extending in opposite directions generally along a first line and a second pair of seats extending in opposite directions generally along a second line with said first line and said second line spaced apart and parallel to on another.

* * * * *